Patented June 17, 1952

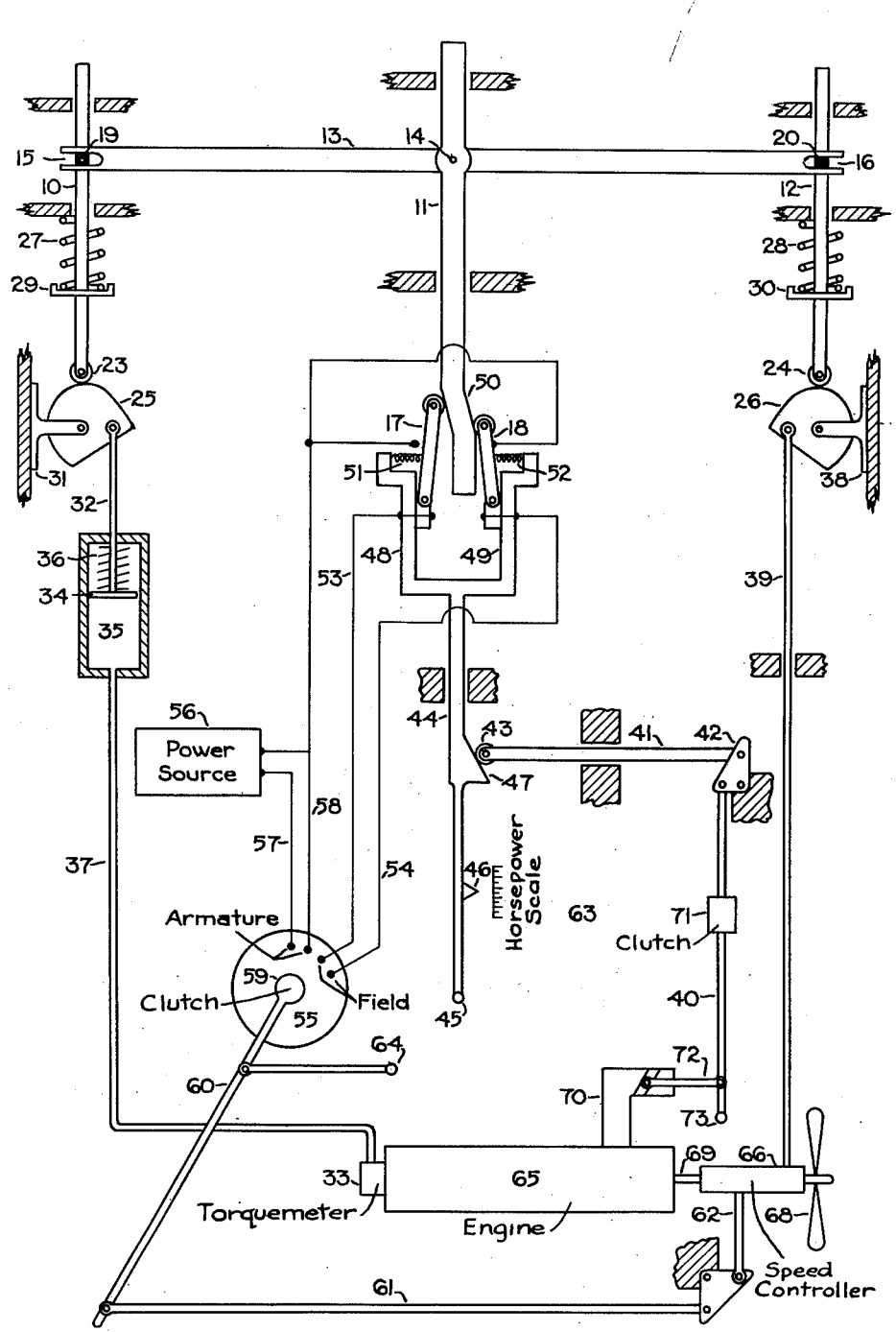

2,600,612

UNITED STATES PATENT OFFICE 2,600,612

AIRCRAFT POWER CONTROL SYSTEM

Francis G. Bollo, Berkeley, Calif., assignor to Shell Development Company, San Francisco, Calif., a corporation of Delaware Application October 12, 1946, Serial No. 703,087

2 Claims. (Cl. 170—135.72)

This invention pertains to the control of internal combustion engines of the spark ignition type, and relates more particularly to an automatic control system for aircraft engines which adjusts and maintains the horsepower delivered by the engine at a desired value by controlling the engine speed to compensate for any changes in engine torque. The control system also adjusts the engine throttle setting to maintain horsepower, engine speed and engine torque in any desired relationship.

The present practice on long range flight operations is to use cruising control charts which, for a particular flight condition, give the engine operating settings which result in the highest overall flight economy, such as manifold pressure, engine speed and fuel flow settings. Each of these factors may be considered as a function of horsepower, which is, at the present time, set by manifold pressure. The desired or optimum horsepower is determined from the flight conditions, such as load, distance to be travelled, altitude, etc.

However, with the introduction of torquemeters as standard equipment on many of the current airplane engines, it is possible to apply improved and simplified airplane controls. Maintaining the proper settings of horsepower and engine speed by manual means is time consuming and requires the constant attention of an operator, as these settings change constantly with varying load and atmospheric conditions.

Engine speed is determined by the horsepower required and the manifold pressure is governed by the setting of the engine throttle. It is generally desirable, in order to obtain maximum operating efficiency, to keep the engine speed as low as possible during long range cruising flights so that the engine throttle is substantially at its maximum opening. In this position a minimum amount of energy is lost in throttling of the intake air supply to the engine. The engine is operated with a wide open throttle until increasing engine speed has caused the manifold pressure to be increased to a limiting value which is dependent upon the mechanical limitations of the engine. As the engine speed continues to increase after the manifold pressure is at the limiting value, it is necessary to adjust the engine throttle to control the manifold pressure.

It is therefore an object of this invention to provide a control system for automatically maintaining horsepower delivered by the engine at a desired value by automatically controlling the speed of the engine.

It is also an object of this invention to provide a control system for automatically adjusting the horsepower delivered by the engine at a desired value by automatically controlling the speed of the engine and the throttle setting.

It is also an object of the present invention to provide an automatic power control system for aircraft engines that adjusts the engine speed to compensate for changing atmospheric conditions, thus simplifying engine controls and control procedure during flight and releasing the operator for other duties.

It is a further object of this invention to provide an automatic power control for aircraft engines which, by simplifying and improving engine controls and control procedures during flights, improves the overall performance of the engine and the economy of operations.

These and other objects will appear from the following description taken with reference to the appended drawings wherein the figure is a schematic diagram illustrating the present system in combination with an aircraft power plant.

While the present invention will be described and illustrated hereinbelow with regard to the use of means such as a reversible motor and speed controller switches, it will be understood that this invention is in no way limited to the use of said means, but may comprise any combination of electrical, mechanical or hydraulic proportioning means capable of periodically actuating the speed controller in such a manner as to maintain a desired horsepower-torque-engine speed balance.

The present aircraft power control system comprises an engine 65 having a torquemeter 33, a propeller shaft 69, a propeller 68 provided with a propeller or engine speed controller 66, and a fuel-metering means 70 with a throttle setting lever 72 to adjust manifold pressure. It is understood that the present system is equally well applicable with aircraft having propellers of a different type than that diagrammatically shown in the drawing, e. g. helicopters. The speed controller 66 may be of any type preferably such as a Hamilton Standard or Curtis Electric propeller and engine speed controller as described in Instruction Manual—Power Plant, B-24-D Airplane, Consolidated Aircraft Corporation, having mechanism to regulate the speed of the engine by adjusting the pitch of the propeller. The speed controller 66 is actuated by a reversible motor 55 through links 62 and 61, arm 60, and torque-limiting clutch 59 to effect a change in the speed of the engine 65 and the propeller 68. At the same time, the controller 66 actuates a rod 39 attached to said speed controller for purposes to be described hereinbelow. Thus the link or rod 62 sets the reference speed of speed setting of the controller or propeller speed governing unit 66 while rod 39 moves with the speed setting element of the governor.

Attached to arm 60 is a handle 64, which, in combination with torque-limiting clutch 59, permits the operator to override the control action of the present system and to determine the setting of the engine speed controlled manually at such times when the present automatic control is not desired for operational reasons.

Reversible, intermittently operating motor 55 receives its operating current from a power source 56 by means of leads 57 and 58 and the field of said motor is connected by leads 53 and 54 to switches 17 and 18. The closure of switch 17 starts the motor operating in one direction, and the closure of switch 18 in the reverse direction.

Switches 17 and 18 are attached to first and second branches, 48 and 49 respectively, of a fork-shaped end piece of pilot's horsepower control bar 44 having attached thereto a handle 45, a pointer 46 on a horsepower scale 63, and a cam 47 which is shaped to give the desired relationship between manifold pressure and horsepower.

In movable contact with cam 47 is wheel 43 at the end of bar 41 which actuates rod 40 through pivotal plate 42 and an override clutch 71, thus effecting a change in throttle setting lever 72. Also attached to rod 40 is handle 73, which, in combination with the override clutch 71, permits the operator to override the control action of the present system and to determine the setting of the throttle lever 72 at such times when the present automatic control is not desired for operational reasons.

Rod 29 is pivotally attached to cam 26 which in turn is pivotally mounted in frame 38 attached to the aircraft structure. Cam 26, which is actuated by rod 39, is in movable contact with wheel 24 at the end of a bar member 12 of a movable frame consisting of first, second and third parallel bar members 10, 11 and 12, linked together by a transverse yoke 13 having a central pivot 14 and slotted ends 15 and 16. Pins 19 and 20, attached to the first and third parallel bar members 10 and 12, are in slotted engagement at the ends of yoke 13 in slots 15 and 16.

Contact between wheel 24 and cam 26 is maintained by a spring 28 acting between part of aircraft structure and plate 30 attached to the third parallel member. Logarithmic cam 26 is so shaped that, when actuated, it imparts to pin 20 a linear motion proportional to the logarithm of the engine speed.

Movement of pin 20 is translated to the transverse yoke 13 and the second or central parallel bar member 11 in pivotal contact with said yoke on pivot 14. Cam 50 at the end of central bar member 11 is at all times in movable contact with switches 17 and 18 due to compression springs 51 and 52.

Linear motion, proportional to the logarithm of the propeller torque of the aircraft engine, is imparted to pin 19 attached to first parallel member 10 when said member is actuated through wheel 23 by logarithmic cam 25 which is shaped to impart said motion. Cam 25 is rotatably mounted on frame 31 attached to aircraft structure and is pivotally actuated by a piston rod 32 attached thereto. The piston rod 32 is in turn attached to a pressure responsive piston 34, movable against the action of a spring 36 by a fluid pressure proportional to the engine torque applied thereto through conduit 37 in communication between the piston chamber 35 and torquemeter 33, which supplies said fluid pressure.

In the above description of one embodiment of the present invention logarithmic cam 25 is actuated by a hydraulic piston assembly 32, 34, 35, 36 and 37 connected to the torquemeter 33 while logarithmic cam 26 is actuated by rod 39 connected to speed controller 66. It is understood that logarithmic cam 25 may also be actuated by a rod similar to rod 39 which may be attached to the torquemeter, while a hydraulic piston assembly in communication between the speed controller and logarithmic cam 26 may actuate said cam 26. Or, both cams may be actuated by rods or both by hydraulic piston assemblies suitably attached to the torquemeter and speed controller.

The operation of this aircraft power control system is based on the torque-horsepower relationship:

$$H = \frac{TN}{k}$$

where $H$ = horsepower
$T$ = torque, lb. ft.
$N$ = engine speed, R. P. M.
$k$ = 33,000

The equation can be converted to an additive form such as:

$$\log H = \log T + \log N - \log k$$

The movements of post 19 and 20 are made proportional to the logarithm of the torque and speed, respectively, by use of logarithmic cams 25 and 26. Consequently, by means of the mechanical linkage, the movement of pivot 14 is proportional to the logarithm of the horsepower. The scale 63 can be calibrated directly in terms of horsepower. Sensitivity, speed of operation, etc., can be governed by the design of the system.

The operation of the present system is as follows:

(1) The system automatically keeps the aircraft power control in balance at all times, especially while cruising, and compensates for any changes in atmospheric conditions. If the aircraft travels from high temperature air to low temperature air, the engine torque would increase causing a proportional increase in the horsepower. The system would automatically reduce the horsepower output to that shown on the horsepower scale by reducing the engine speed. Since the torque increased, torquemeter 33 would supply, through conduit 37, to piston chamber 35, a fluid pressure proportional to the increase in torque. The fluid pressure would move piston 34 and piston rod 32 so that cam 25 would be actuated to change the position of pin 19, transverse yoke 13, central parallel member 11 and cam 50, attached thereto. Cam 50 would move to close speed controller switch 18 which would start motor 55 so that linkage arms 60, 61 and 62 would reset engine speed controller 66 thereby decreasing the engine speed. This decrease in engine speed would cause speed controller 66 to actuate rod 39 and logarithmic cam 26, connected thereto. Movement of cam 26 imparts to pin 20, attached to third parallel member 12, a linear motion proportional to the logarithm of the engine speed which causes a change in the position of pin 20, transverse yoke 13, central parallel member 11 and cam 50, attached thereto. Thus cam 50 would open switch 18 to stop motor 55 as said cam returned to its neutral position between open speed controller switches 17 and 18.

(2) Whenever the horsepower setting of the system is changed, for example, increased, the upward movement of the slidable bar member 44 having cam 47 attached thereto, closes speed controller switch 17. The closing of switch 17 energizes motor 55 to rotate, thereby moving the connecting arms 60, 61 and 62 and resetting the speed controller 66. This increases the speed of the engine 65, the fuel-air ratio being controlled by means, such for example, as an automatic carburetor. This increase in engine speed would cause speed controller 66 to actuate rod 39 and logarithmic cam 26, connected thereto. Movement of cam 26 imparts to pin 20, attached to third parallel member 12, a linear motion proportional to the logarithm of the engine speed which causes a change in position of pin 20, transverse yoke 13, central parallel member 11 and cam 50, attached thereto, said change in position of cam 50 acting to open speed controller switch 17.

Movement of bar member 44 simultaneously causes cam 47 to actuate bar member 41, pivotal plate 42 and rod 40 thus changing the setting of the engine throttle setting lever 72 which changes the torque of the engine 65. Pressure proportional to the engine torque is applied by torquemeter 33 through conduit 37 to piston chamber 35 and piston 34 located therein, causing piston rod 32 to move attached cam 25. Movement of logarithmic cam 25 imparts to pin 19, attached to first parallel member 10, a linear motion proportional to the logarithm of the engine torque. Movement of pin 19 causes transverse yoke 13 to pivot on pin 20 thus changing the position of central parallel member 11 and cam 50 attached thereto. so that a second force acts to open speed controller switch 17.

When the system is in balance, for any horsepower setting, the forces applied to logarithmic cams 25 and 26 and thus translated to pins 19 and 20 hold cam 50 of second parallel member 11 in a neutral position between speed controller switches 17 and 18 which both remain open. Whenever the system gets out of balance, cam 50 moves, closing switch 17 or 18 thus starting the motor 55 in one direction or the other, which increases or decreases the speed of the engine 65 until the system is again in balance.

Although cams 25 and 26 have been described as logarithmic, it is obvious that they may if necessary be given other desired shapes. Thus if the movement of links 32 or 39 is not linear with respect to speed or torque, then the shape of cams 25 or 26 should be modified accordingly, so as to impart to the members 10 and 12 a motion which is a logarithmic function of the torque and engine speed.

I claim as my invention:

1. In combination with a spark ignition type aircraft engine wherein the horsepower delivered to a variable pitch propeller is a function of the engine speed and the engine torque, a control system for adjusting and maintaining the operation of said engine at a predetermined horsepower, said system comprising torque measuring means connected to the shaft of said engine, speed controller means affixed to said engine and propeller for regulating the speed of said engine by varying the pitch of said propeller, reversible prime mover means, including an electric circuit, connected to actuate said speed control means, linkage means connecting said prime mover means and said speed controller means, horsepower selector means, air-metering means mounted on said engine, linkage means connecting said air-metering means to the horsepower selector means, electrical switch means in the prime mover means circuit mounted on said horsepower selector means for selectively actuating said prime mover means in opposite directions, pivotally-mounted cam means, linkage means mounted in sliding engagement with the surfaces of said cam means and in contact with said switch means, and transmission means connecting said cam means to each of said torque measuring means and said speed controller means.

2. In combination with a spark ignition type aircraft engine wherein the horsepower delivered to a variable pitch propeller is a function of the engine speed and the engine torque, a control system for adjusting and maintaining the operation of said engine at a predetermined horsepower, said system comprising torque measuring means connected to the shaft of said engine, speed controller means affixed to said engine and propeller for regulating the speed of said engine by varying the pitch of said propeller, reversible prime mover means connected to actuate said speed controller means, linkage means connecting said prime mover means and said speed controller means, horsepower selector means, electrical switch means mounted on one end of said horsepower selector means, said electrical switch means comprising two movable contacting members for selectively actuating said reversible prime mover means in opposite directions, air-metering means mounted on said engine, linkage means connecting said air-metering means to the horsepower selector means, and transmission means connecting the electrical switch means to said torque measuring means and said speed controller means respectively, said transmission means comprising a pair of pivotally mounted logarithmic cams, linkage means having one end in sliding engagement with the surface of said cams and the other end in contact with at least one of said electrical switch means, one of said cams being actuated by said torque measuring means and the other cam being actuated by said speed controller means.

FRANCIS G. BOLLO.

REFERENCES CITED

The following references are of record in the file of this patent:

UNITED STATES PATENTS

| Number | Name | Date |
|---|---|---|
| 2,195,036 | Palmer | Mar. 26, 1940 |
| 2,303,998 | Holley | Dec. 1, 1942 |
| 2,321,381 | Hammond | June 8, 1943 |
| 2,322,303 | Martin | June 22, 1943 |
| 2,336,844 | Buck | Dec. 14, 1943 |
| 2,374,276 | French | Apr. 24, 1945 |
| 2,391,323 | Martin | Dec. 18, 1945 |
| 2,453,651 | Mock | Nov. 9, 1948 |